Aug. 31, 1943. H. W. LÖCKMANN ET AL 2,328,475
ENDLESS BELT
Filed Aug. 23, 1939

Inventors,
H. W. Löckmann
H. Wand
By Glascock Downing & Seebold
Attys.

Patented Aug. 31, 1943

2,328,475

UNITED STATES PATENT OFFICE 2,328,475

ENDLESS BELT

Hans Walter Löckmann, Bielefeld, and Heinrich Wana, Berlin, Germany; vested in the Alien Property Custodian Application August 23, 1939, Serial No. 291,596
In Germany August 25, 1938

1 Claim. (Cl. 74—567)

The object of this invention is the provision of an endless belt, band, chain or the like which is characterized by the feature that cams, elevations, grooves, notches, channels, lamellae or the like are arranged thereon for the purpose of imparting impulses.

The invention has the following advantages as compared with the known taking up of impulses from cams, elevations, and the like arranged on wheels or shafts:

The range of the possible impulse frequencies is considerably widened in a downward direction. The period of the impulses does not require to coincide with the period of a shaft rotation. Since the length of path at disposal for the arrangement of impulse producers is greater than corresponds to the periphery of a wheel or of a shaft, it is possible to arrange numerous impulse producers at the most different distances apart. Different kinds of impulse producers may be arranged, on the same or on different sides of the belt or the like and further on the same side in different lines of motion, which either impart impulses to different devices or to the same device under varying working conditions. The impulses may be of mechanical nature and may exert pressure, tension or carrying-along forces on the device. Electrical or magnetic impulses may also be imparted, for instance by lamellae which give impulses to measuring and counting instruments or current producers. Further, there is a greater freedom as regards the place of disposition of the impulse takers, since if necessary the belt or the like may be lengthened and displaced as desired within wide limits.

Several constructional forms and modes of employment of the invention are shown by way of example in the accompanying drawing, in which.

Figure 1:
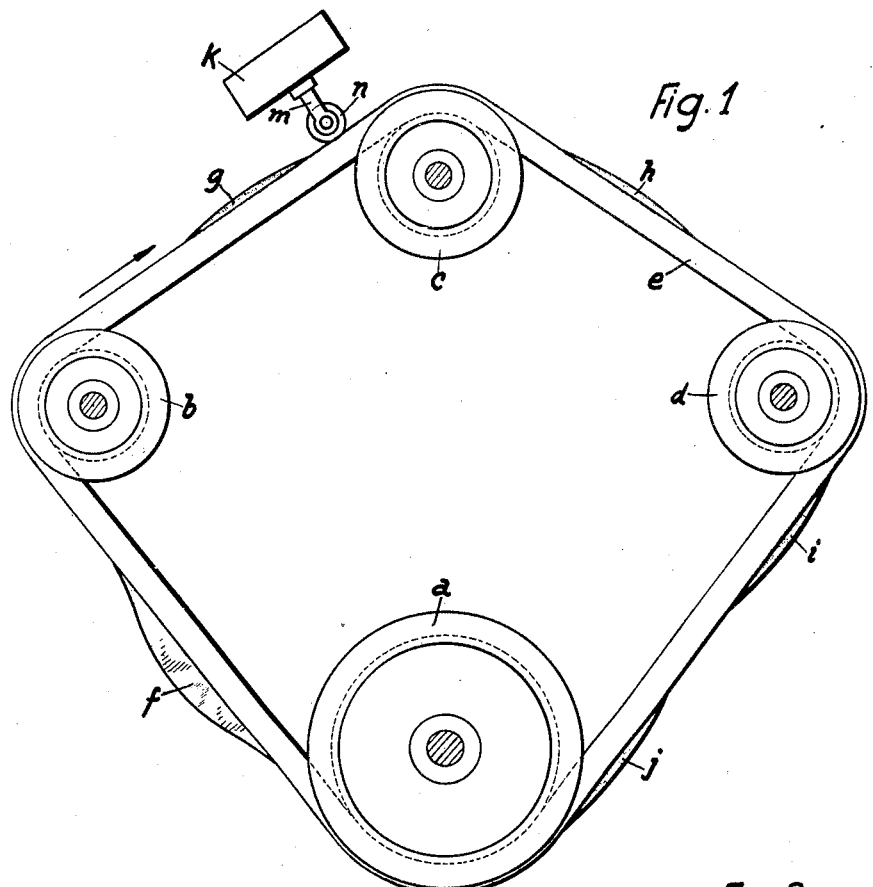
Figure 1 is a side elevation partly in section showing the invention applied to an automobile engine.

Figure 1 shows as example the known arrangement of an endless V-belt in an automobile engine. $a$ is the driving belt pulley on the crankshaft; of the three driven belt pulleys $b$ is on the magneto shaft, $c$ on the fan shaft and $d$ on the water pump shaft. $e$ is the V-belt of usual trapezium-shaped cross section. In this constructional form of the invention different bulges or cams are arranged on the outer surface of the belt. $f$ is a bulge of greater elevation whilst $g$, $h$, $i$, $j$ are bulges of lesser elevation. The bulges operate the fuel pump $k$. This is of normal construction but is provided at the end of the actuating plunger or lever $m$ with a freely running wheel $n$, for which a ball bearing may serve.

During normal running of the engine the plunger $m$ of the pump is raised by the main bulge $f$ and thereby the forwarding spring of the petrol pump is stressed. To the extent to which the pump by de-tensioning of the forwarding spring forces petrol into the carburettor, the plunger $m$ sinks and comes nearer to the belt $e$ until the bulge $f$ again completely tensions the forwarding spring the next time it passes by.

As compared with the normal driving of the pump by cams of the camshaft the following advantages are obtained:

The pump is no longer directly disposed on the engine and is less subjected to heat radiation therefrom. Direct metallic connection between the pump body, by way of plunger and attachment flange with the hot engine body and motor oil is avoided. Further, when actuation is effected by means of the camshaft the pump is operated unnecessarily frequently and consequently strained. When the rate of revolution is high the plunger frequently floats, the forwarding spring has no time between the individual actuations to de-tension and therefore to forward fuel, or in other words the quantity forwarded falls, the wear is very high and moreover the pump operates very noisily. In the arrangement according to the invention the pump is operated much less frequently with production of the same performance, the actuation also is gentle and non-destructive since the curve of the bulge or cam can be made flat on account of the greater space which is at disposal; the elasticity of the V-belt material also has an anti-destructive and noise dampening effect. Should one stroke brought about by means of the cam $f$ not be sufficient to to meet the petrol requirements, such as for example on starting up after standing for a relatively long time, then this results in the plunger wheel $n$ approaching the belt $e$ again all the sooner. The lower cams $g$, $h$, $i$, $j$ then come into operation, imparting four further impulses. Figure 1 shows the plunger wheel $n$ in this position. The advantage of this arrangement is that four impulses can be imparted when required, but when not required excessive wear is avoided by imparting fewer impulses. Moreover, the forwarding of fuel is ensured even at high speed of revolution of the engine because between the individual passages of the main cam $f$ past the wheel $n$ the pump spring always has time to detension itself and so forward petrol. Flotation of the plunger can never occur.

It is immaterial whether the process occurs as described at the pump $k$ or whether the little wheel $n$ continuously runs on the belt under spring pressure and the imparting of the working impulse proper displaced as usual into the interior of the pump, say in the form of a "drag" coupling. It is further unimportant whether plunger or lever transmission is used, and whether the device is actuated by impact or pull, by cams or grooves, or otherwise. There are numerous further possibilities of actuation and use, of which only a few are shown by way of example in Figures 2 to 4.

Figure 2:
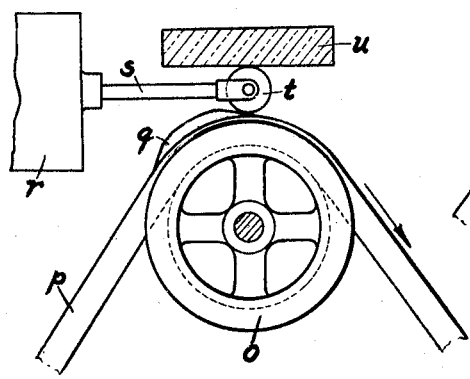
Figure 2 is an elevational view partly in section of a modified form of the invention.

In Figure 2 there is shown a possible pull arrangement by way of example. Around the wheel $o$ the V-belt $p$ runs with the cam $q$. $r$ is the device to be actuated, $s$ the pull rod transmitting the impulse, $t$ being a little wheel on said pull rod. $u$ is a resilient counter-member. The pull rod $s$ with the little wheel $t$ is shown in the position of rest. If the belt $p$ and the cam $q$ move in the direction of the arrow, then the little wheel $t$, which otherwise has no contact with the belt, is taken and rolled along between the cam $q$ and the counter support $u$ and thereby actuates the pull rod $s$. By suitable shaping of the cam $q$, by enlarging the diameter of the wheel $o$, it is also possible in this way, by the belt $p$ being guided for a longer time parallel to the member $u$, say by arrangement of the two belt-wheels, to produce strokes of any desired length which are initiated gently and which die away gently. It is preferable in this constructional example to provide the cam $q$ of somewhat resilient material or to arrange the device $r$ pivotally in the plane of the wheel $o$ so that it can forthwith follow the yield of the resilient counterpiece $u$, or to connect the small running wheel $t$ to the rod $s$ by means of a connection capable of swivelling at one end, so that at one end it can deviate upwardly somewhat.

Figure 3:
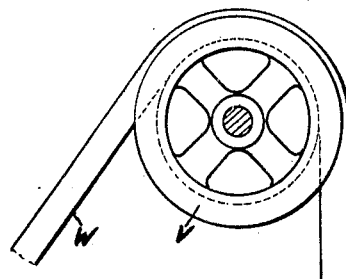
Figure 3 is a fragmentary elevational view partly in section of a further modified form of the invention.

In Figure 3 the belt $w$ runs over the wheel $v$ and has lamellae $x$ let therein. An electro-magnet $y$ is so arranged with respect to the belt $w$ that the known effects are produced in it by the passage of the lamellae $x$ past the same.

Figure 4:
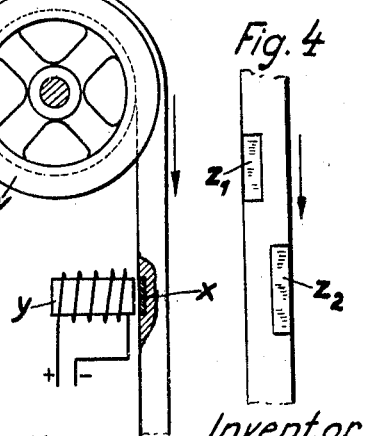
Figure 4 is an elevational view of a modified form of belt.

In Figure 4 there is shown a portion of a belt $e'$ having two cams, lamellae or the like, $z_1$, $z_2$ arranged thereon or therein in different lines of motion.

It is believed in view of the foregoing description that a further detailed description of the invention is entirely unecessary. Likewise it is believed that the advantages of the invention are readily apparent.

What we claim is:

A device of the character described, including in combination a pull rod for movement in a predetermined path having a roller at the outer end thereof, a resilient guide member above the roller, an endless belt adjacent to the roller, projections arranged on the outer surface of the said belt to contact said roller and effect a lateral displacement of the pull rod in its predetermined path along the guide member in the direction of rotation of the belt.

HANS WALTER LÖCKMANN.
HEINRICH WANA.